(12) United States Patent
Spears et al.

(10) Patent No.: US 9,765,912 B2
(45) Date of Patent: Sep. 19, 2017

(54) TELESCOPING PIPE COUPLING

(71) Applicant: SPEARS MANUFACTURING CO., Sylmar, CA (US)

(72) Inventors: Wayne Spears, Agua Dulce, CA (US); Robert Wayne Spears, II, Sylmar, CA (US); Alan Lunt, Simi Valley, CA (US)

(73) Assignee: SPEARS MANUFACTURING CO., Sylmar, CA (US)

( * ) Notice: Subject to any disclaimer, the term of this patent is extended or adjusted under 35 U.S.C. 154(b) by 0 days.

(21) Appl. No.: 14/932,452

(22) Filed: Nov. 4, 2015

(65) Prior Publication Data

US 2016/0131289 A1   May 12, 2016

Related U.S. Application Data

(60) Provisional application No. 62/075,996, filed on Nov. 6, 2014.

(51) Int. Cl.
*F16L 27/12* (2006.01)
*F16L 37/091* (2006.01)
*F16L 47/02* (2006.01)

(52) U.S. Cl.
CPC .............. *F16L 27/12* (2013.01); *F16L 37/091* (2013.01); *F16L 47/02* (2013.01); *Y10T 29/49826* (2015.01)

(58) Field of Classification Search
CPC ......... F16L 27/12; F16L 37/091; F16L 47/02; Y10T 29/49826
USPC .............. 285/302, 340, 145.1, 298
See application file for complete search history.

(56) References Cited

U.S. PATENT DOCUMENTS

| | | |
|---|---|---|
| 2,779,610 A | 1/1957 | Risley |
| 3,312,483 A | 4/1967 | Leadbetter et al. |
| 3,312,484 A | 4/1967 | Davenport |
| 3,429,596 A | 2/1969 | Marshall |
| 3,591,208 A | 7/1971 | Nicolaus |
| 3,814,136 A | 6/1974 | Johnson et al. |
| 4,062,572 A | 12/1977 | Davis |
| 4,072,328 A | 2/1978 | Elliott |
| 4,288,113 A | 9/1981 | Saulnier |
| 4,372,586 A | 2/1983 | Rosenberg et al. |

(Continued)

OTHER PUBLICATIONS

Flo Control Quality Products by NDS products Catalog, Sep. 2014, 32 pages.

(Continued)

*Primary Examiner* — Gregory Binda
*Assistant Examiner* — Zachary Dragicevich
(74) *Attorney, Agent, or Firm* — Jeffrey G. Sheldon; Katherine B. Sales

(57) ABSTRACT

A telescoping pipe coupling comprising a hollow body, a hollow tubular insert slidably disposed within the body, two gasket wells, two end connectors, one end connector coupled to each end of the telescoping pipe coupling, two gripper washer wells, a gasket for sealing the tubular insert with the body, two gaskets for sealing one or more pipe sections to the telescoping pipe coupling, two gasket retaining rings each comprising a shoulder, two gripper washers retained within the two gripper washer wells each comprising an outer periphery, wherein the shoulder of each gasket retaining ring is adjacent to the outer periphery of a gripper washer.

17 Claims, 2 Drawing Sheets

(56) References Cited

U.S. PATENT DOCUMENTS

| | | |
|---|---|---|
| 4,445,714 A | 5/1984 | Kisiel, III |
| 4,919,457 A | 4/1990 | Moretti |
| 4,932,686 A * | 6/1990 | Anderson, Jr. ......... F16L 27/12 |
| | | 285/148.19 |
| 5,024,469 A * | 6/1991 | Aitken ................... F16L 27/12 |
| | | 285/302 |
| 5,487,572 A | 1/1996 | Combot-Courrau et al. |
| 5,553,901 A | 9/1996 | Serot |
| 5,911,443 A | 6/1999 | Le Quere |
| 6,056,326 A | 5/2000 | Guest |
| 6,450,550 B1 | 9/2002 | Cornwell |
| 6,464,266 B1 | 10/2002 | O'Neill et al. |
| 7,063,359 B2 | 6/2006 | Vallee |
| 7,121,593 B2 | 10/2006 | Snyder, Sr. et al. |
| 7,530,606 B1 | 5/2009 | Yang |
| 7,841,630 B1 | 11/2010 | Auray et al. |
| 8,313,607 B2 * | 11/2012 | Quinn .................... F16L 25/12 |
| | | 156/293 |
| 8,480,134 B2 | 7/2013 | Crompton et al. |
| 8,491,012 B2 | 7/2013 | Lequere |
| 8,608,205 B2 | 12/2013 | Lai |
| 8,764,066 B1 * | 7/2014 | Rice ..................... F16L 37/091 |
| | | 285/15 |
| 8,844,981 B1 | 9/2014 | Crompton et al. |
| 2007/0075542 A1 | 4/2007 | Glaze et al. |
| 2012/0326439 A1 | 12/2012 | Bogert et al. |
| 2014/0062078 A1 * | 3/2014 | Weissmann ........... F16L 13/116 |
| | | 285/80 |
| 2015/0345683 A1 * | 12/2015 | Crompton ........... F16L 37/0915 |
| | | 285/340 |
| 2016/0097477 A1 | 4/2016 | Spears et al. |
| 2016/0131296 A1 | 5/2016 | Spears et al. |

OTHER PUBLICATIONS

USPTO, Non-Final Office Action on the Merits issued in related Spears et al. U.S. Appl. No. 14/876,791 on Apr. 18, 2016, 20 pages.
USPTO, Final Office Action on the Merits issued in related Spears et al. U.S. Appl. No. 14/876,791 on Sep. 1, 2016, 12 pages.
USPTO, Non-Final Office Action on the Merits issued in related Spears et al. U.S. Appl. No. 14/932,510 on Mar. 11, 2016, 10 pages.
USPTO, Final Office Action on the Merits issued in related Spears et al. U.S. Appl. No. 14/932,510 on Jul. 7, 2016, 9 pages.
USPTO, Non-Final Office Action on the Merits issued in related Spears et al. U.S. Appl. No. 14/876,791 on Jan. 12, 2017 (24 pages).

* cited by examiner

TELESCOPING PIPE COUPLING

CROSS-REFERENCE TO RELATED APPLICATIONS

The present Application claims the benefit of U.S. Provisional Patent Application No. 62/075,996 titled "Telescoping Pipe Coupling," filed Nov. 6, 2014, the contents of which are incorporated in this disclosure by reference in their entirety.

BACKGROUND OF THE INVENTION

Telescoping pipe couplings for joining two sections of pipe are well known. Telescoping pipe couplings are used to join together two separate pipe sections, either during the initial construction of a piping system or in the maintenance of an existing piping system. Telescoping pipe couplings are most commonly used in the repair of PVC and other plastic pipes.

Telescoping pipe couplings are made with (i) an elongated, hollow body having a smooth bore and (ii) an interior tube slidably disposed in telescoping fashion within the smooth bore. The interior surface of the body is typically lubricated to facilitate axial movement.

One or more O-rings or other suitable gaskets are disposed around the circumference of the interior tube to seal the interior tube to the interior surface of the body, while allowing axial movement of the interior tube back and forth within the body.

During installation, each pipe section is attached to one of the two open ends of the telescoping pipe coupling with adhesives or by welding techniques. Thus, the attachment of the pipe sections to the telescoping pipe coupling requires considerable time and effort. This is especially a problem when a telescoping pipe coupling is used to repair a leaking or damaged pipe system and time is of the essence.

Accordingly, there is a need for an improved telescoping pipe coupling which avoids this problem in the prior art. The present invention satisfies this need.

SUMMARY OF THE INVENTION

In an embodiment of the present invention, there is provided a telescoping pipe coupling comprising a) a hollow body comprising a first open end, a second open end, an exterior surface and an interior surface; b) a hollow tubular insert slidably disposed within the body, the hollow tubular insert comprising a first open end, a second open end, an exterior surface and an interior surface; c) a first gasket well defined within the internal surface of the first open end of the hollow body; d) a second gasket well defined within the internal surface of the first open end of the hollow tubular insert; e) a first end connector coupled to the first open end of the hollow body, the first end connector comprising an internal surface; f) a second end connector coupled to the first open end of the hollow tubular insert, the second end connector comprising an internal surface; g) a first gripper washer well defined within the internal surface of the first end connector; h) a second gripper washer well defined within the internal surface of the second end connector; i) a first gasket disposed around the exterior surface of the hollow tubular insert for sealing the exterior surface of the hollow tubular insert with the interior surface of the hollow body; j) a second gasket disposed within the first gasket well for sealing an exterior surface of one or more pipe sections to the hollow body; k) a third gasket disposed within the second gasket well for sealing an exterior surface of one or more pipe sections to the hollow tubular insert; l) a first gasket retaining ring disposed between the first end connector and the second gasket for retaining the second gasket within the first gasket well, the first gasket retaining ring comprising a first shoulder; m) a second gasket retaining ring disposed between the second end connector and the third gasket for retaining the third gasket within the second gasket well, the second gasket retaining ring comprising a second shoulder; n) a first gripper washer retained within the first gripper washer well, the first gripper washer comprising an outer periphery; and o) a second gripper washer retained within the second gripper washer well, the second gripper washer comprising an outer periphery; wherein the outer periphery of the first gripper washer is adjacent to the first shoulder of the first gasket retaining ring and the outer periphery of the second gripper washer is adjacent to the second shoulder of the second gasket retaining ring.

In another embodiment of the present invention, there is provide a method of using a telescoping pipe coupling, wherein the method comprises the steps of: a) providing the telescoping pipe coupling according to the present invention; b) inserting an end of first pipe section into the first open end of the hollow body; and c) inserting an end of a second pipe section into the first open end of the hollow tubular insert.

DRAWINGS

Features, aspects and advantages of the present invention will become better understood with reference to the following description, appended claims, and accompanying drawings where:

DETAILED DESCRIPTION OF THE INVENTION

Figure 1:
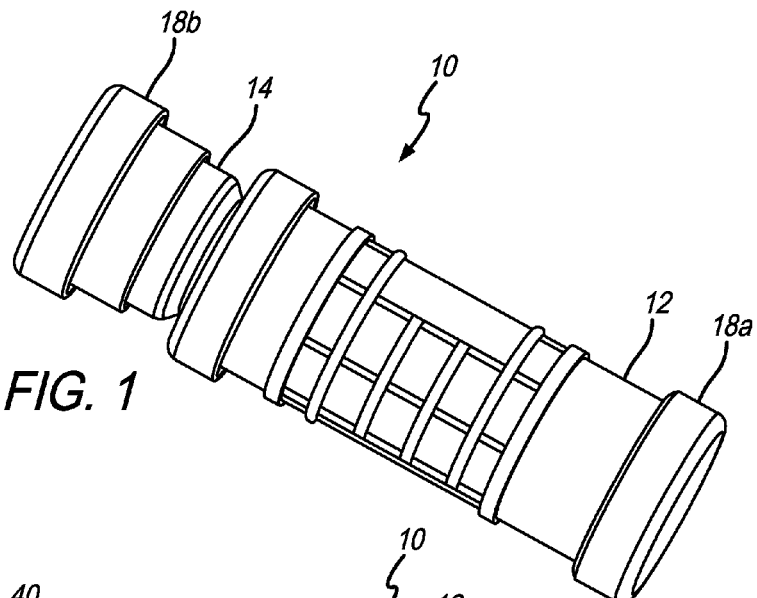
FIG. 1 is a perspective view of a telescoping pipe coupling having features of the invention.

The following discussion describes in detail one embodiment of the invention and several variations of that embodiment. This discussion should not be construed, however, as limiting the invention to those particular embodiments. Practitioners skilled in the art will recognize numerous other embodiments as well.

Definitions

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers, ingredients or steps.

The Invention

The invention is a telescoping pipe coupling 10 suitable for joining a first pipe section (not shown) in fluid tight communication with a second pipe section (not shown). The telescoping pipe coupling 10 comprises a hollow body 12, a hollow tubular insert 14, a first gasket well 16a, a second gasket well 16b, a first end connector 18a, a second end connector 18b, a first gripper washer well 20a, a second gripper washer well 20b, a first gasket 22 for sealing the hollow tubular insert 14 with the hollow body 12, a second gasket 24a and a third gasket 24b for sealing the one or more pipe sections to the telescoping pipe coupling 10, a first gasket retaining ring 26a, a second gasket retaining ring 26b, wherein each gasket retaining ring 26a, 26b comprises a shoulder 28, a first gripper washer 30a and a second gripper washer 30b.

The hollow body 12 can be any size and dimension, and made from any material, including but not limited to plastic, polyvinyl chloride, rubber or metal. The cross-section of the hollow body 12 can be any shape, but preferably the cross-section of the hollow body 12 is circular and the hollow body 12 is cylindrical. The hollow body 12 has a first open end 32, a second open end 34, an exterior surface 36 and an interior surface 38. The hollow body 12 defines a linear passageway 56 between the first open end 32 of the hollow body 12 and the second open end 34 of the hollow body 12. The linear passageway 56 typically has a circular interior diameter.

The hollow tubular insert 14 is slidably disposed within the hollow body 12. The hollow tubular insert 14 can be any size and dimension, and made from any material, including but not limited to plastic, polyvinyl chloride, rubber or metal. The hollow tubular insert 14 has a first open end 40, a second open end 42, an exterior surface 44 and an interior surface 46. The hollow tubular insert 14 defines a linear passageway 58 between the first open end 40 of the hollow tubular insert 14 and the second open end 42 of the hollow tubular insert 14. The hollow tubular insert 14 is disposed within the hollow body 12 such that a fluid entering the telescoping pipe coupling 10 via the first open end 32 of the hollow body 12 can flow to the hollow tubular insert 14 via the second open end 42 of hollow tubular insert 14, flow through the hollow tubular insert 14 and exit the telescoping pipe coupling 10 via the first open end 40 of the hollow tubular insert 14.

Figure 2:
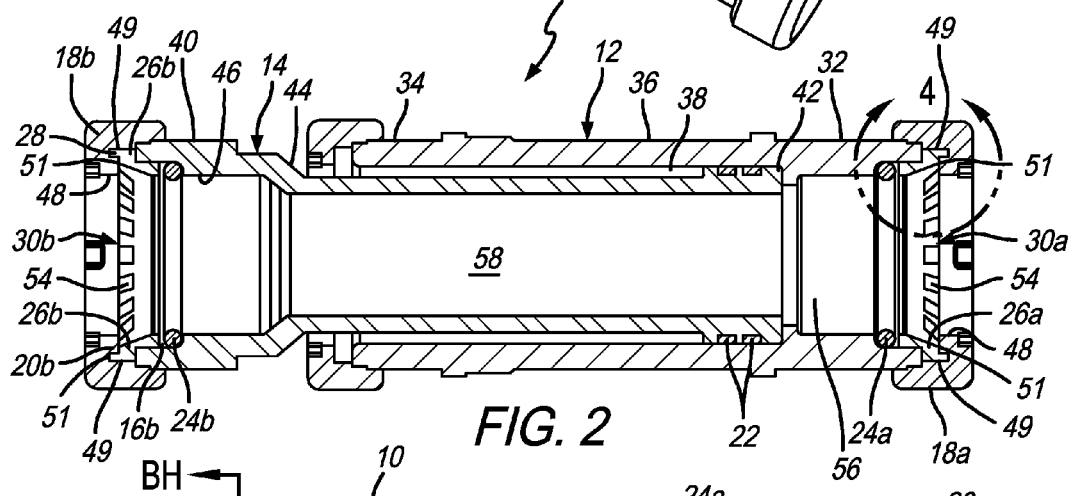
FIG. 2 is a cross-sectional view taken along line BH-BH of the telescoping pipe coupling illustrated in FIG. 1.
Figure 3:
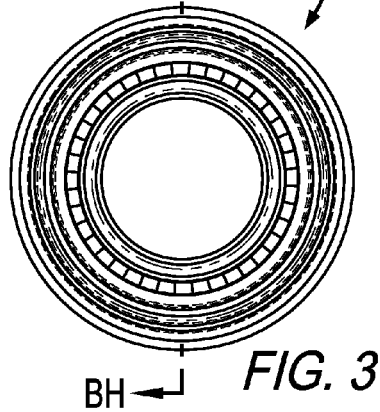
FIG. 3 is an end view of the telescoping pipe coupling illustrated in FIG. 1.
Figure 4:
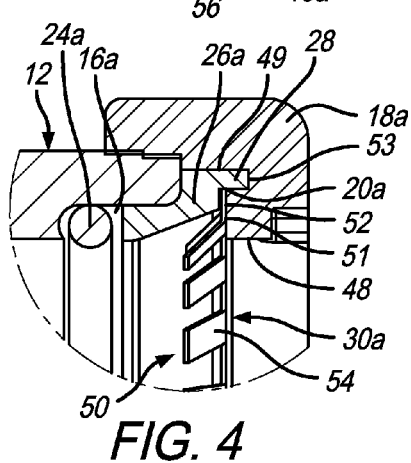
FIG. 4 is a magnified detail view of a portion of the telescoping pipe coupling illustrated in FIG. 2.
Figure 5:
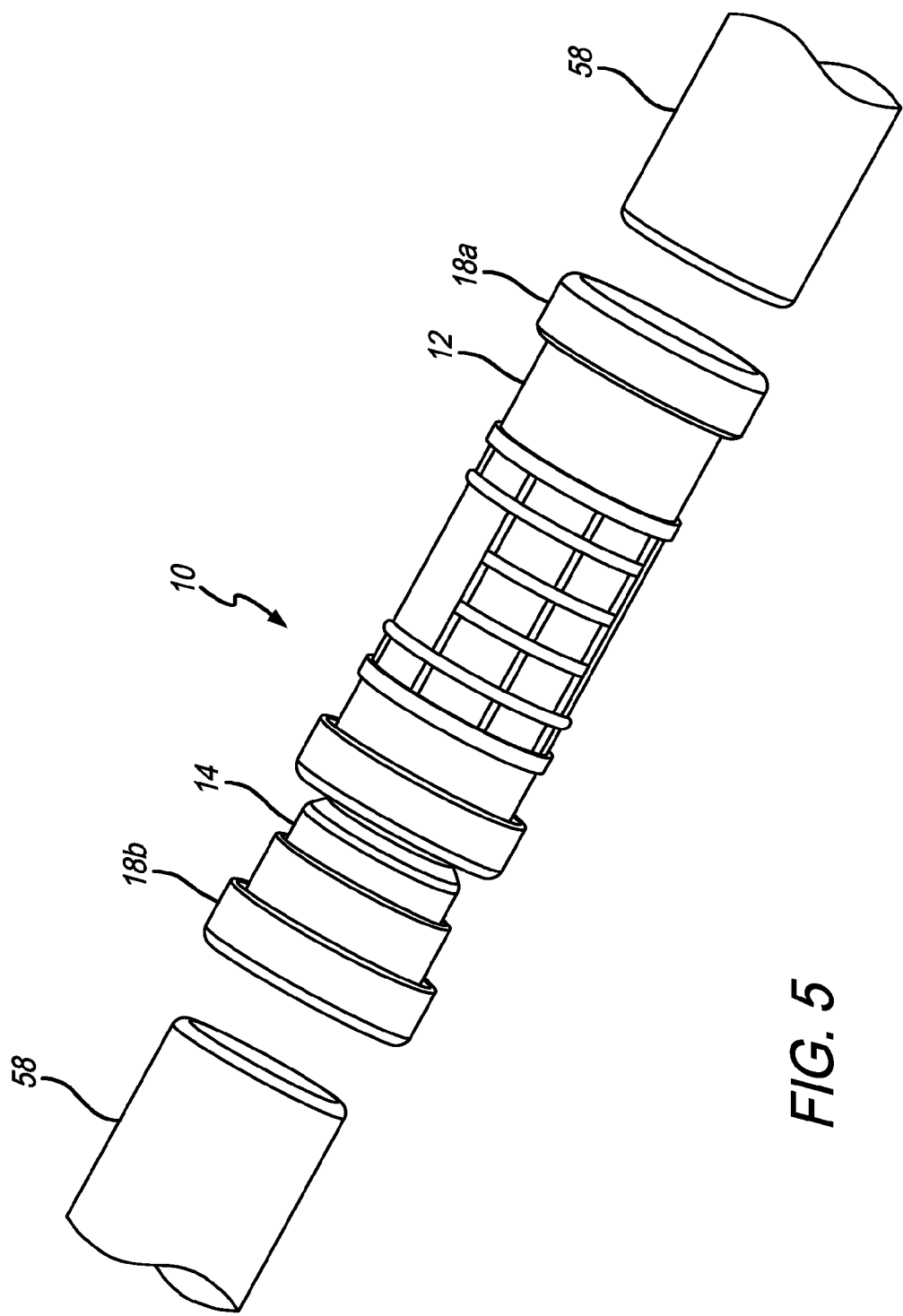
FIG. 5 is a perspective view of the telescoping pipe coupling of FIG. 1, wherein the ends of the two pipe sections that the telescoping pipe coupling couples to, can be seen.

The first and second end connectors 18a, 18b can be any size and dimension, and made from any material, including but not limited to plastic, polyvinyl chloride, rubber or metal. An end connector 18a, 18b is attached to each of the opposed ends of the telescoping pipe coupling 10. In the embodiment illustrated in FIGS. 1 and 2 there is a first end connector 18a connected to the first open end 32 of the hollow body 12, and a second end connector 18b connected to the first open end 40 of the hollow tubular insert 14. Each end connector 18a, 18b comprises an internal surface 48. The first and second end connectors 18a, 18b are attached to the telescoping pipe coupling 10 by any means, including but not limited to friction welding, sonic welding or a suitable adhesive. As shown in FIGS. 2 and 4, the first and second end connectors 18a, 18b, each also include a radially facing interior surface 49 and an axially facing interior surface 51 that includes a groove 53 disposed therein.

The first gasket 22 seals the exterior surface 44 of the hollow tubular insert 14 with the interior surface 38 of the hollow body 12, and typically comprises one or more O-rings or other suitable gaskets disposed around the exterior surface 44 of the hollow tubular insert 14.

The second and third gaskets 24a, 24b provide for the sealing of each pipe section 58 to the telescoping pipe coupling 10. As illustrated in FIG. 2, the second and third gaskets 24a, 24b can be one or more O-rings or other suitable gaskets disposed around the interior surface 38, 46 of both the hollow body 12 and the hollow tubular insert 14. Typically, the second gasket 24a is disposed proximate to the first open end 32 of the hollow body 12 and the third gasket 24b is disposed proximate to the first open end 40 of the hollow tubular insert 14. The second gasket 24a is retained within the first gasket well 16a by the first gasket retaining ring 26a, and the third gasket 24b is retained within the second gasket well 16b by the second gasket retaining ring 26b. Each gasket retaining ring 26a, 26b comprises a shoulder 28.

The first, second and third gaskets 22, 24a, 24b can be any size and dimension, and made from any material, including but not limited to plastic, rubber, metal, silicone or elastomeric material Many known elastomeric materials can be used in the first, second and third gaskets 22, 24a, 24b such as EPDM, neoprene, silicone, buna-N, Hypalon™, (Hypalon is a trademark for chlorosulfonated polyethylene (CSPE) synthetic rubber (CSM)) polyurethane, Santoprene™, (Santoprene is a trademark for Thermoplastic Elastomer (TPE) Thermoplastic Vulcanate (TPV) vinyl and Viton™ (Viton is a trademark for FKM).

In the embodiment illustrated in the drawings, the first gripper washer 30a is retained within the first gripper washer well 20a defined within the internal surface 48 of the first end connector 18a, and the second gripper washer 30b is retained within the second gripper washer well 20b defined within the internal surface 48 of the second end connector 18b.

Typically, the gripper washer 30a, 30b is more proximate to an open end of the telescoping pipe coupling 10 than the second and third gaskets 24a, 24b. The first and second gripper washers 30a, 30b are washer-like structures, typically metallic structures having an inner periphery 50 and an outer periphery 52. In the embodiment illustrated in the drawings, the first gripper washer 30a is retained between the first end connector 18a and the first gasket retaining ring 26a, such that the outer periphery 52 of the first gripper washer 30a is adjacent to the shoulder 28 of the first gasket retaining ring 26a, and the second gripper washer 30b is retained between the second end connector 18b and the second gasket retaining ring 26b, such that the outer periphery 52 of the second gripper washer 30b is adjacent to the shoulder 28 of the second gasket retaining ring 26b. By "adjacent," it is meant that the gripper washer 30a, 30b can be in contact with or in close proximity to the shoulder 28.

As shown in FIGS. 2 and 4, only the shoulders 28 of the first and second gasket retaining rings 26a, 26b prevent the gripper washers 30a, 30b from contacting the radially facing interior surfaces 49 of the end connectors 18a, 18b, respectively. It should be noted that without the first and second shoulders 28, the narrow outer periphery 52 of the first and second gripper washers 30a, 30b would contact the radially facing interior surfaces 49 of first and second end connectors 18a, 18b, respectively. The shoulders 28 of the first and second gasket retaining rings 26a, 26b protect the first and second end connectors 18a, 18b from premature failure due to contact with the narrow outer periphery 52 of the first and second gripper washers 30a, 30b. Such protection is especially important where the materials used to construct the telescoping pipe coupling 10 include CPVC or other materials which are notch sensitive.

The inner periphery 50 of the first and second gripper washers 30a, 30b comprise a large plurality of gripping fingers 54 which have been bent inwardly at an angle. The interior diameter of the first and second gripper washers 30a, 30b are chosen be slightly smaller than the outside diameter of the pipe sections 58 for which the telescoping pipe coupling 10 is to be used. Each gripper washer 30a, 30b is disposed at an open end of the telescoping pipe coupling 10 such that the gripping fingers 54 protrude toward the interior of the telescoping pipe coupling 10. Thus, when a pipe section 58 is thrust into an open end of the telescoping pipe coupling 10, the pipe section 58 slips smoothly along the gripping fingers 54 of the first and second gripper washers 30a, 30b. Once fully disposed within the open end of the telescoping pipe coupling 10, however, the pipe section 58 cannot be slid in a reverse direction relative to the gripping fingers 54. The gripping fingers 54 retain the pipe section 58 firmly within the telescoping pipe coupling 10.

Optionally, there can be more than two gripper washers 30a, 30b disposed in the telescoping pipe coupling 10. The multiple gripper washers 30a, 30b can be disposed back to back of one another, or disposed in series, spaced apart from one another or within one another, such that the gripping fingers 54 of the multiple gripper washers 30a, 30b are oriented in the same direction. The multiple gripper washers 30a, 30b can be disposed within the same gripper washer well 20a, 20b, or within different gripper washer wells.

It can be appreciated, therefore, that the telescoping pipe coupling 10 of the invention efficiently and effectively avoids the aforementioned problems inherent in prior art telescoping pipe couplers. Using the telescoping pipe coupling 10 of the invention, the attachment of pipe sections 58 to opposite ends of the telescoping pipe coupling 10 of the invention is quickly and easily accomplished—by merely slipping an open end of the telescoping pipe coupling 10 over an end of a pipe section 58. No time and effort need be expended in firmly attaching the telescoping pipe coupling 10 to each pipe section end 58 with adhesives or welding procedures.

Having thus described the invention, it should be apparent that numerous structural modifications and adaptations may be resorted to without departing from the scope and fair meaning of the instant invention as set forth herein above and described herein below by the claims.

What is claimed is:

1. A telescoping pipe coupling comprising:
a) a hollow body comprising a first open end, a second open end, an exterior surface and an interior surface;
b) a hollow tubular insert slidably disposed within the body, the hollow tubular insert comprising a first open end, a second open end, an exterior surface and an interior surface;
c) a first gasket well defined within the internal surface of the first open end of the hollow body;
d) a second gasket well defined within the internal surface of the first open end of the hollow tubular insert;
e) a first end connector coupled to the first open end of the hollow body, the first end connector being made from PVC or CPVC and comprising an axially facing interior surface and a radially facing interior surface, the axially facing interior surface having a first groove formed therein;
f) a second end connector coupled to the first open end of the hollow tubular insert, the second end connector being made from PVC or CPVC and comprising an axially facing interior surface and a radially facing interior surface, the axially facing interior surface having a second groove formed therein;
g) a first gripper washer well defined within the internal surface of the first end connector;
h) a second gripper washer well defined within the internal surface of the second end connector;
i) a first gasket disposed around the exterior surface of the hollow tubular insert for sealing the exterior surface of the hollow tubular insert with the interior surface of the hollow body;
j) a second gasket disposed within the first gasket well for sealing an exterior surface of one or more pipe sections to the hollow body;
k) a third gasket disposed within the second gasket well for sealing an exterior surface of one or more pipe sections to the hollow tubular insert;
l) a first gasket retaining ring disposed between the first end connector and the second gasket for retaining the second gasket within the first gasket well, the first gasket retaining ring comprising a first shoulder disposed within the first groove of the first end connector;
m) a second gasket retaining ring disposed between the second end connector and the third gasket for retaining the third gasket within the second gasket well, the second gasket retaining ring comprising a second shoulder disposed within the second groove of the second end connector;
n) a first gripper washer retained within the first gripper washer well between the first gasket and the first end connector; and
o) a second gripper washer retained within the second gripper washer well between the second gasket and the second end connector;
wherein only the first shoulder of the first gasket retaining ring prevents the first gripper washer from contacting the radially facing interior surface of the first end connector and only the second shoulder of the second gasket retaining ring prevents the second gripper washer from contacting the radially facing interior surface of the second end connector.

2. The telescoping pipe coupling according to claim 1, wherein the hollow body defines a linear passageway between the first open end of the hollow body and the second open end of the hollow body, wherein the linear passageway comprises a circular interior diameter.

3. The telescoping pipe coupling according to claim 1, wherein the hollow tubular insert defines a linear passageway between the first open end of the hollow tubular insert and the second open end of the hollow tubular insert.

4. The telescoping pipe coupling according to claim 1, wherein the hollow tubular insert is disposed within the hollow body such that a fluid entering the telescoping pipe coupling via the first open end of the hollow body can flow to the tubular insert via the second open end of the hollow tubular insert, flow through the hollow tubular insert and exit the telescoping pipe coupling via the first open end of the hollow tubular insert.

5. The telescoping pipe coupling according to claim 1, wherein the first gasket comprises one or more O-rings.

6. The telescoping pipe coupling according to claim 1, wherein each of the second and third gaskets comprise one or more O-rings.

7. The telescoping pipe coupling according to claim 6, wherein a first one of the one or more O-rings comprising the second gasket is disposed proximate to the first open end of the hollow body and a second one of the one or more O-rings comprising the third gasket is disposed proximate to the first open end of the hollow tubular insert.

8. The telescoping pipe coupling according to claim 1, wherein the first and second gripper washers each comprise an inner periphery comprising a plurality of gripping fingers which are bent inwardly.

9. The telescoping pipe coupling according to claim 8, wherein the gripping fingers are metallic.

10. A method of using a telescoping pipe coupling, the method comprising the steps of:
 a) providing the telescoping pipe coupling according to claim 1;
 b) inserting an end of a first pipe section into the first open end of the hollow body; and
 c) inserting an end of a second pipe section into the first open end of the hollow tubular insert.

11. The method of claim 10, wherein the hollow body defines a linear passageway between the first open end of the hollow body and the second open end of the hollow body, wherein the linear passageway comprises a circular interior diameter.

12. The method of claim 10, wherein the hollow tubular insert is disposed within the hollow body such that a fluid entering the telescoping pipe coupling via the first open end of the hollow body can flow to the tubular insert via the second open end of the hollow tubular insert, flow through the hollow tubular insert and exit the telescoping pipe coupling via the first open end of the hollow tubular insert.

13. The method of claim 10, wherein the first gasket comprises one or more O-rings.

14. The method of claim 10, wherein each of the second and third gaskets comprise one or more O-rings.

15. The method of claim 14, wherein a first one of the one or more O-rings comprising the second gasket is disposed proximate to the first open end of the hollow body and a second one of the one or more O-rings comprising the third gasket is disposed proximate to the first open end of the hollow tubular insert.

16. The method of claim 10, wherein the first and second gripper washers each comprise an inner periphery comprising a plurality of gripping fingers which are bent inwardly.

17. The method of claim 16, wherein the gripping fingers are metallic.

* * * * *